United States Patent
Hampton et al.

(10) Patent No.: US 10,077,746 B2
(45) Date of Patent: Sep. 18, 2018

(54) NOISE ATTENUATION UNIT FOR ENGINE SYSTEMS

(71) Applicants: Keith Hampton, Ann Arbor, MI (US); David Fletcher, Flint, MI (US); Brian M. Graichen, Leonard, MI (US); Rex Bravo, Detroit, MI (US)

(72) Inventors: Keith Hampton, Ann Arbor, MI (US); David Fletcher, Flint, MI (US); Brian M. Graichen, Leonard, MI (US); Rex Bravo, Detroit, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 15/441,663

(22) Filed: Feb. 24, 2017

(65) Prior Publication Data
US 2017/0159622 A1  Jun. 8, 2017

Related U.S. Application Data

(63) Continuation of application No. 14/565,075, filed on Dec. 9, 2014, now Pat. No. 9,617,958.
(Continued)

(51) Int. Cl.
*F02M 35/12* (2006.01)
*F02M 35/10* (2006.01)
(Continued)

(52) U.S. Cl.
CPC .. *F02M 35/1272* (2013.01); *F02M 35/10118* (2013.01); *F02M 35/1211* (2013.01); *F16L 55/02745* (2013.01); *F16L 55/0336* (2013.01)

(58) Field of Classification Search
CPC ............ F02M 35/1211; F02M 35/1272; F16L 55/02745; F16L 55/0336
(Continued)

(56) References Cited

U.S. PATENT DOCUMENTS

| 2,037,884 A | 4/1936 | Day |
| 2,905,268 A | 9/1959 | McMichael |

(Continued)

FOREIGN PATENT DOCUMENTS

| CN | 2400655 | 10/2000 |
| CN | 201907500 | 7/2011 |

(Continued)

OTHER PUBLICATIONS

CN, Office Action with English Translation; Chinese Application No. 2014800021792 (Aug. 28, 2017).
(Continued)

*Primary Examiner* — Jeremy Luks
(74) *Attorney, Agent, or Firm* — FisherBroyles, LLP; Susan M. Oiler

(57) ABSTRACT

Noise attenuation units are disclosed that are connectable in a system as part of a fluid flow path. Such units include a housing defining an internal cavity and having a first port and a second port each connectable to a fluid flow path and in fluid communication with one another through the internal cavity, and a noise attenuating member seated in the internal cavity of the housing within the flow of the fluid communication between the first port and the second port. The noise attenuating member enables the fluid communication between the first port and the second port to flow through the noise attenuating member.

13 Claims, 6 Drawing Sheets

Related U.S. Application Data

(60) Provisional application No. 61/913,668, filed on Dec. 9, 2013, provisional application No. 61/971,008, filed on Mar. 27, 2014.

(51) Int. Cl.
*F16L 55/027* (2006.01)
*F16L 55/033* (2006.01)

(58) Field of Classification Search
USPC .................................. 181/229, 252, 256, 258
See application file for complete search history.

(56) References Cited

U.S. PATENT DOCUMENTS

| | | | |
|---|---|---|---|
| 2,626,009 | A | 9/1960 | Sebok et al. |
| 2,954,091 | A | 9/1960 | McMichael |
| 3,430,437 | A | 3/1969 | Saussele et al. |
| 3,614,859 | A | 10/1971 | Clark |
| 3,698,510 | A | 10/1972 | Blatt et al. |
| 3,842,932 | A | 10/1974 | Gibel |
| 4,354,492 | A | 10/1982 | McPhee |
| 4,424,883 | A | 1/1984 | Musiani |
| 4,893,654 | A | 1/1990 | Feuz |
| 4,938,309 | A | 7/1990 | Emdy |
| 5,326,942 | A | 7/1994 | Schmid |
| 5,783,780 | A | 7/1998 | Watanabe et al. |
| 6,321,870 | B1 * | 11/2001 | Waronitza ............ B60H 1/2203 181/214 |
| 7,610,140 | B2 | 10/2009 | Hirooka |
| 7,628,170 | B2 | 12/2009 | Kok-Hiong et al. |
| 7,878,299 | B2 * | 2/2011 | Geyer, III ............... F01N 1/082 181/229 |
| 8,517,056 | B2 | 8/2013 | Cullin |
| 2002/0027041 | A1 | 3/2002 | Czabala et al. |
| 2005/0045417 | A1 | 3/2005 | Ni |
| 2005/0045419 | A1 | 3/2005 | Choi et al. |
| 2007/0292816 | A1 | 12/2007 | Miller |
| 2010/0199958 | A1 | 8/2010 | Heckel et al. |
| 2013/0213510 | A1 | 8/2013 | Burnham et al. |
| 2014/0014080 | A1 | 1/2014 | Beshay et al. |
| 2014/0165962 | A1 | 6/2014 | Pursifull |

FOREIGN PATENT DOCUMENTS

| | | |
|---|---|---|
| DE | 102006016937 A1 | 10/2007 |
| EP | 1602820 A2 | 12/2005 |
| JP | H07-117010 B2 | 12/1995 |
| JP | 2009168134 | 7/2009 |
| WO | 2001/086152 A1 | 11/2001 |

OTHER PUBLICATIONS

EP, European Supplementary Search Report; Application No. 14869909.3 (Jun. 30, 2017).
PCT, International Search Report and Written Opinion; International Application No. PCT/US2014/069279 (Feb. 26, 2015).
PCT, International Search Report and Written Opinion; International Application No. PCT/US2015/033079 (Aug. 21, 2015).
US, Final Office Action; U.S. Appl. No. 14/509,612 (Jun. 22, 2016).
CN, Search Report with English Translation; Chinese Patent Application No. 201480001422.9 (Jul. 20, 2016).
CN, Office Action with English Translation; Chinese Application No. 201480001422.9 (Aug. 1, 2016).
US, Final Office Action; U.S. Appl. No. 14/600,598 (Aug. 19, 2016).
US, Advisory Action; U.S. Appl. No. 14/509,612 (Sep. 1, 2016).
US, Notice of Allowance; U.S. Appl. No. 14/509,602 (Oct. 17, 2016).

* cited by examiner

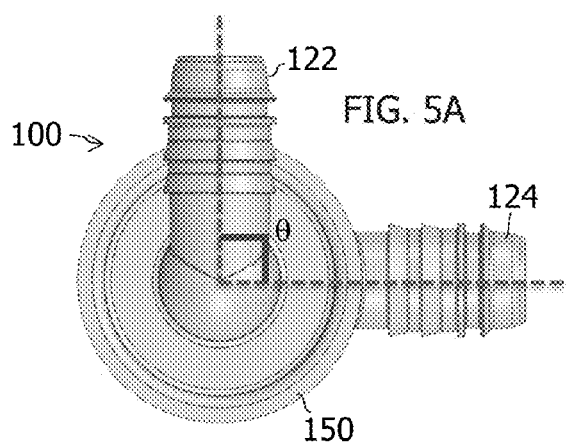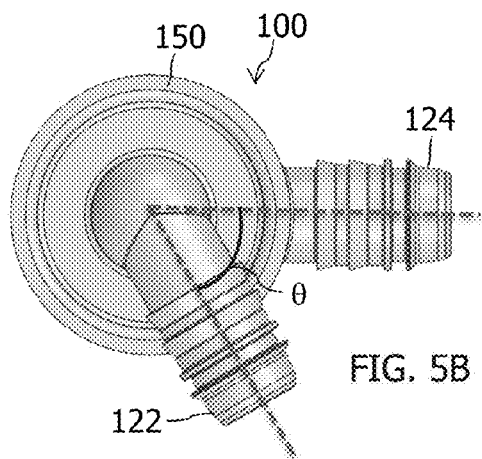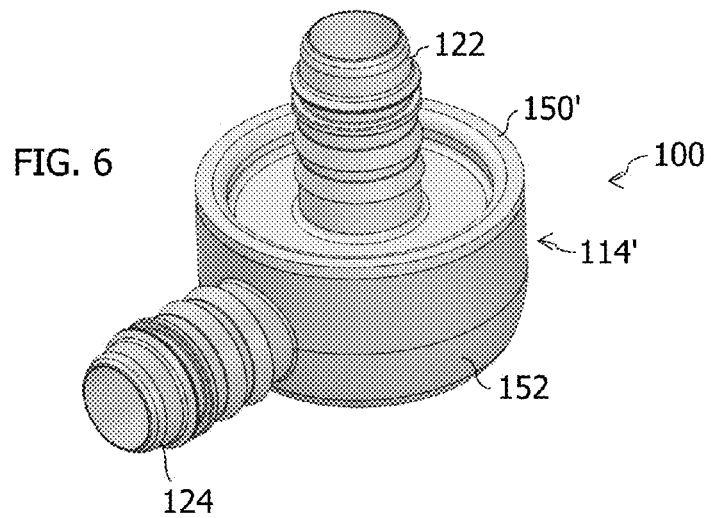

NOISE ATTENUATION UNIT FOR ENGINE SYSTEMS

RELATED APPLICATIONS

This application is a continuation of U.S. application Ser. No. 14/565,075, filed Dec. 9, 2014, which claims the benefit of U.S. Provisional Application No. 61/913,668, filed Dec. 9, 2013 and U.S. Provisional Application No. 61/971,008, filed Mar. 27, 2014.

TECHNICAL FIELD

This application relates to noise attenuation in engine systems such as internal combustion engines, more particularly to the inclusion of a porous member in a housing configured for insertion in a fluid flow path of an engine.

BACKGROUND

Engines, for example vehicle engines, often include aspirators and/or check valves. Typically, the aspirators are used to generate a vacuum that is lower than engine manifold vacuum by inducing some of the engine air to travel through a Venturi. The aspirators may include check valves therein or the system may include separate check valves. When the check valves are separate, they are typically included downstream between the source of vacuum and the device using the vacuum.

During most operating conditions of an aspirator or check valve, the flow is classified as turbulent. This means that, in addition to the bulk motion of the air, there are eddies superimposed. These eddies are well known in the field of fluid mechanics. Depending on the operating conditions, the number, physical size, and location of these eddies are continuously varying. One result of these eddies being present on a transient basis is that they generate pressure waves in the fluid. These pressure waves are generated over a range of frequencies and magnitudes. When these pressure waves travel through the connecting holes to the devices using this vacuum, different natural frequencies can become excited. These natural frequencies are oscillations of either the air or the surrounding structure. If these natural frequencies are in the audible range and of sufficient magnitude, then the turbulence-generated noise can become heard, either under the hood and/or in the passenger compartment. Such noise is undesirable and new apparatus are needed to eliminate or reduce the noise resulting from the turbulent air flow.

SUMMARY

In one aspect, noise attenuation units are disclosed that are connectable in a system as part of a fluid flow path. Such units include a housing defining an internal cavity and having a first port and a second port each connectable to a fluid flow path and in fluid communication with one another through the internal cavity, and a noise attenuating member seated in the internal cavity of the housing within the flow of the fluid communication between the first port and the second port. The noise attenuating member enables the fluid communication between the first port and the second port to flow through the noise attenuating member. In one embodiment, the first port and the second port are aligned opposite one another.

In another embodiment, one or more of the first port and the second port includes an elbow. The portion of the housing having the elbow is positionable for sealing attachment to the other portion with the elbow oriented at any angle in a 360 degree radius relative to the port included in the other portion. In one embodiment, one of the first port and the second port enters the internal cavity from the top or the bottom of the housing and the other enters from a side of the housing, and optionally includes the elbow. Also, whichever of the first port and the second port enters the housing from the side is typically offset from the center of the housing.

In one embodiment, the noise attenuating member comprises a porous material. Additionally, the noise attenuating member may include one or more bores therethrough aligned for fluid communication with at least one of the first port or the second port. The one or more bores in the noise attenuating member are larger than pores of the porous material.

In another embodiment, the noise attenuating member includes one or more bores therethrough aligned for fluid communication with at least one of the first port or the second port. The fluid communication between the first port and the second port may include a secondary fluid flow path around one or more outer sides of the noise attenuating member. To facilitate the flow path around one or more sides of the noise attenuating member, the internal cavity may include a plurality of support members extending from an interior bottom thereof upward into the internal cavity to collectively define a first seat upon which the noise attenuating member is seated. Also, the internal cavity may include a plurality of positioning members. The plurality of positioning members are typically each longer than each of the plurality of support members, and are positioned to be juxtaposed to the sound attenuating member. Furthermore, the plurality of support members may be spaced apart from one another to define a plurality of pathways for fluid flow underneath the noise attenuating member.

In one embodiment, the noise attention member is disposed within the internal cavity at a position spaced apart from interior walls of the internal cavity and thereby defines a fluid flow passage between the noise attenuating member and the interior walls, which is in fluid communication with the plurality of pathways underneath the noise attenuating member. The interior bottom beneath the noise attenuating member may be generally shaped as an interior of one-half of a horn torus when viewed as a transverse cross-section.

In another embodiment, the noise attenuating member is dimensioned for a tight fit within the housing thereby defining only fluid flow through the sound attenuating member. In this embodiment, the noise attenuating member may include a hollow portion therein having an open first end and a closed second end. The hollow portion has larger pores than that of the porous material defining the noise attenuating member. In one embodiment, the hollow portion is generally cone-shaped and may be defined by a plurality of stacked plugs, one of which has a depression and the others having bores therethrough.

BRIEF DESCRIPTION OF THE DRAWINGS

FIGS. 5A and 5B are top plan views of the sound attenuation unit of FIG. 4, but with the first port in alternate positions relative to the second port.

FIG. 6 is a front, perspective view of a sound attenuation unit similar to FIG. 4, but with an alternate upper portion having a first port of a straight configuration.

DETAILED DESCRIPTION

Figure 1:
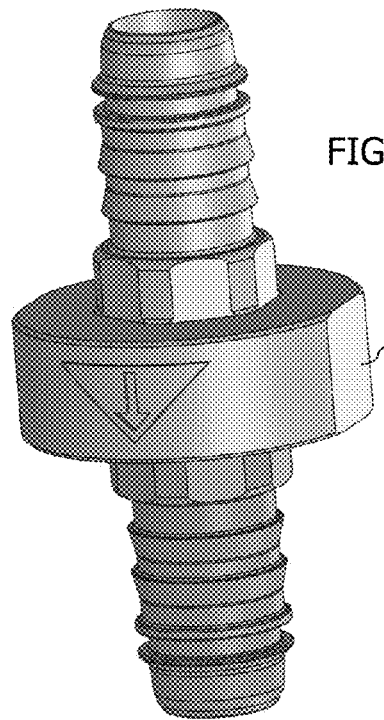
FIG. 1 is a front, perspective view of a sound attenuation unit connectable to become part of a fluid flow path.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

FIG. 1 is an external view of a noise attenuating unit, generally identified by reference number 10, for use in an engine, for example, in a vehicle's engine. The engine may be an internal combustion engine, and the vehicle and/or engine may include a device requiring a vacuum. Check valves and/or aspirators are often connected to an internal combustion engine before the engine throttle and after the engine throttle. The engine and all its components and/or subsystems are not shown in the figures, and it is understood that the engine components and/or subsystems may include any components common to an internal combustion engine. The brake boost system is one example of a subsystem that can be connected to an aspirator and/or check valve. In another embodiment, any one of a fuel vapor purge system, exhaust gas recirculation system, a crankcase ventilation system and/or a vacuum amplifier may be connected to an aspirator and/or check valve. The fluid flow within the aspirator and/or check valves, in particular when a Venturi portion is included, is generally classified as turbulent. This means that in addition to the bulk motion of the fluid flow, such as air or exhaust gases, there are pressure waves traveling through the assembly and different natural frequencies can become excited, thereby resulting in turbulence-generated noise. The noise attenuation unit 10 disclosed herein attenuates such turbulence-generated noise.

Figure 2:
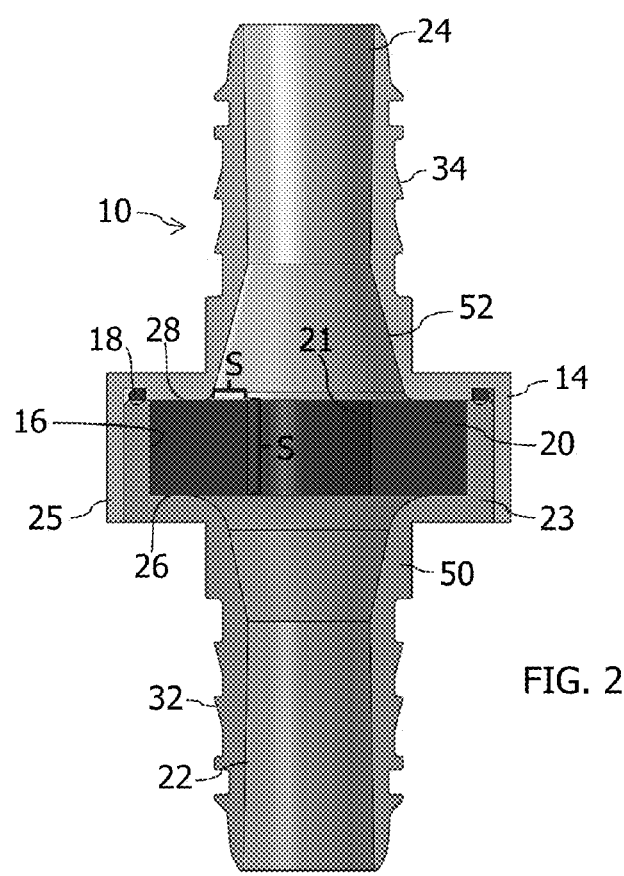
FIG. 2 is a longitudinal, cross-sectional view of the sound attenuation unit of FIG. 1.

Referring to FIGS. 1 and 2, the noise attenuation unit 10 may be disposed in, and thereby becomes part of, any fluid flow path(s) within an engine in need of noise attenuation, and is typically positioned in the flow path downstream of the source of the noise. The noise attenuating unit 10 includes a housing 14 defining an internal cavity 16 enclosing a noise attenuating member 20 therein. The noise attenuating member 20 typically fits securely within the internal cavity sandwiched between a first seat 26 and a second seat 28. The housing defines a first port 22 in fluid communication with the internal cavity 16 and a second port 24 in fluid communication with the internal cavity 16. The exterior surfaces of the housing 14 that define the first and second ports 22, 24 both include fitting features 32, 34 for connecting the noise attenuating unit 10 into a fluid flow path of the engine. For example, in one embodiment both fitting features 32, 34 are insertable into a hose or conduit and the fitting features provide a secure fluid-tight connection thereto.

Figure 4:
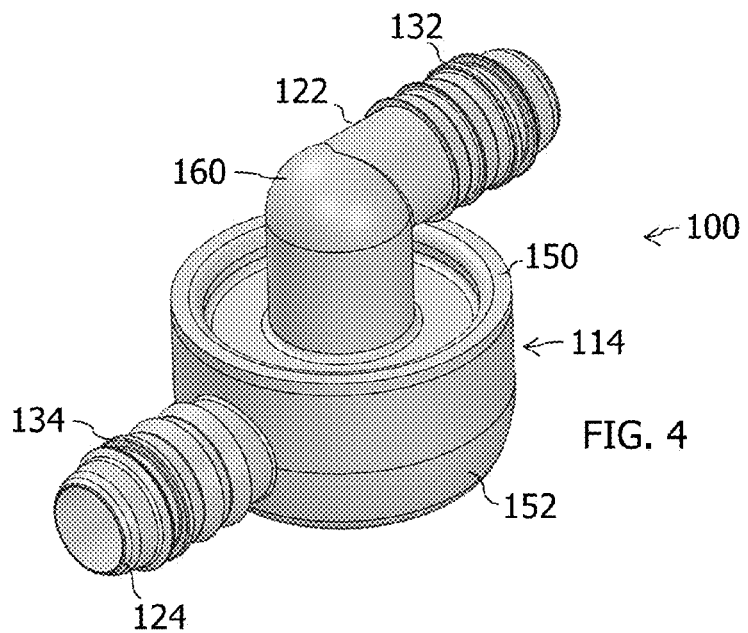
FIG. 4 is a front perspective view of a second embodiment of a sound attenuation unit connectable to become part of a fluid flow path.

The housing 14, as shown in FIG. 2, may be a multiple piece housing with a plurality of pieces connected together with a fluid-tight seal. The multiple pieces may include a first housing portion 50 that includes the first port 22 and a male end 23 and a second housing portion 52 that includes the second port 24 and a female end 25. The male end 23 is received in the female end 25 with a sealing member 18 therebetween to provide a fluid-tight seal between the portions 50, 52. In other embodiments, the first housing portion 50 and the second housing portion 52 have a container and cap type construction such as shown in FIG. 4 and described below.

In FIG. 2, the noise attenuating member 20 is dimensioned for a tight fit within the housing and thereby the fluid flow through the internal cavity 16 is only available through the sound attenuating member 20 itself and any bores it may include.

In the embodiment of FIG. 2, the first port 22 and the second port 24 are positioned opposite one another to define a generally linear flow path through the noise attenuation unit 10, but are not limited to this configuration. In another embodiment, the first and second ports 22, 24 may be positioned relative to one another at an angle of less than 180 degrees, which may include configurations similar to FIGS. 4-6.

Referring to FIG. 2, the sound attenuating member 20 is porous such that fluid flow through the unit 10 is restricted the least amount possible, but sound (turbulence-generated noise) is attenuated. The porous sound attenuating member 20 can be made from a variety of materials including metals, plastics, ceramics, or glass. The sound attenuating members may be made from wire, woven or matted, sintered particles, fibers woven or matted, but are not limited thereto. The porous character of the sound attenuating members causes the noise pressure waves to attenuate by interfering with themselves, but should be of sufficient size and shape to not unduly restrict or interfere with fluid flow, for example, air flow through the system. In one embodiment, the sound attenuating members are not harmed (do not deteriorate) by operating temperatures of an engine based on placement of the unit in the engine system. Additionally, the sound attenuating members are not harmed by the vibrations experienced during operating conditions of the engine.

Figure 3A:
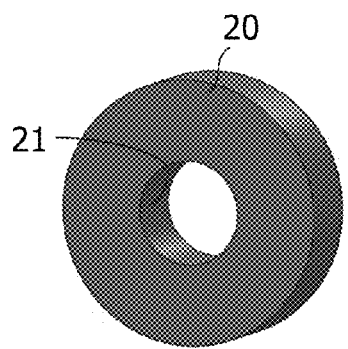
FIG. 3A is a top, perspective view of one embodiment of a sound attenuating member having a central bore therethrough.
Figure 3B:
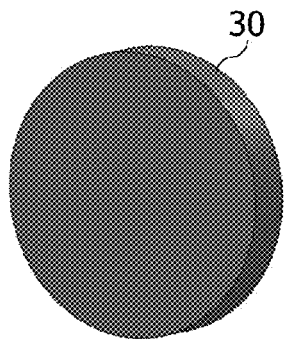
FIG. 3B is a top, perspective view of a porous sound attenuating member.
Figure 3C:
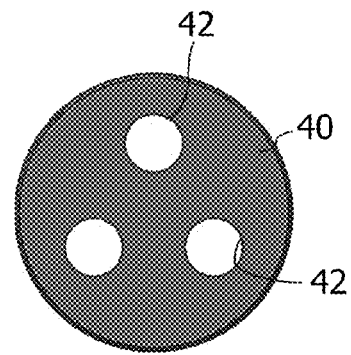
FIG. 3C is a top plan view of another embodiment of a sound attenuating member having a plurality of bores therethrough.
Figure 3D:
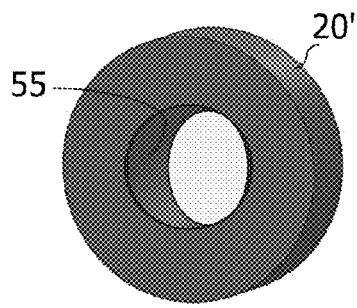
FIG. 3D is a top, perspective view of one embodiment of a sound attenuating member having a central bore that is conical or funnel-shaped.

As shown in FIG. 3B, the porous sound attenuating member may be a continuous plug of porous material, generally identified by the reference number 30, with the only passageways therethrough being channels defined by its natural porosity, i.e., no enlarged bore holes are present, such as those shown in FIGS. 3A, 3C and 3D. The continuous plug may be any shape and configuration to fit within the cavity 16 of the sound attenuating unit 10, but as illustrated may be disc-shaped.

As shown in FIG. 3A, the porous sound attenuating member 20 includes one bore hole 21, but as shown in FIG. 3C, a second porous sound attenuating member 40 may include more than one bore hole 42. The bore holes provide the benefit of minimizing unwanted bulk flow restriction within the sound attenuating unit 10. The bore holes 21, 42 may be circular in cross-section and define a regular cylindrical hole therethrough as shown in FIG. 3A or define a funnel-shaped hole 55 therethrough as shown in the porous sound attenuating member 20' of FIG. 3D, but are not limited thereto. In another embodiment, the bore holes 21, 42 may be elliptical or polygonal in cross-section. The hole's axis(es) will be generally parallel to the direction of flow in or out of at least one of the first port 22 or the second port 24.

As shown in FIG. 3A, if a single bore hole 21 is present, it may be generally centrally positioned within the sound attenuating member 20, but is not limited thereto. The dimensions of the bore hole 21 are typically smaller than the internal dimensions of the first port 22, but are not limited thereto. When the bore hole 21 is circular in cross-section, the diameter of the bore hole 21 may be about 8 mm to about 14 mm. As shown in FIG. 3C, a plurality of bore holes 42 are present and are symmetrically positioned relative to one another within the porous sound attenuating member 20. These bore holes 42 may be circular in cross-section as shown, but are not limited thereto. As described for FIG. 3A, hereto the dimensions of the bore holes 42 are smaller than the internal dimensions of the first port 22. When bore holes 42 are circular in cross-section, the diameter of each may be about 3 mm to about 5 mm.

Figure 3E:
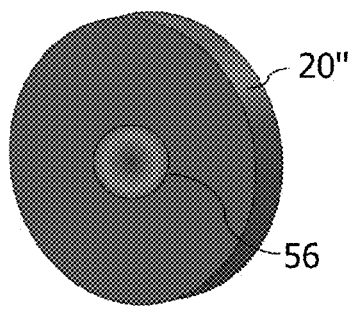
FIG. 3E is a top, perspective view of one embodiment of a sound attenuating member having a recess therein.
Figure 10:
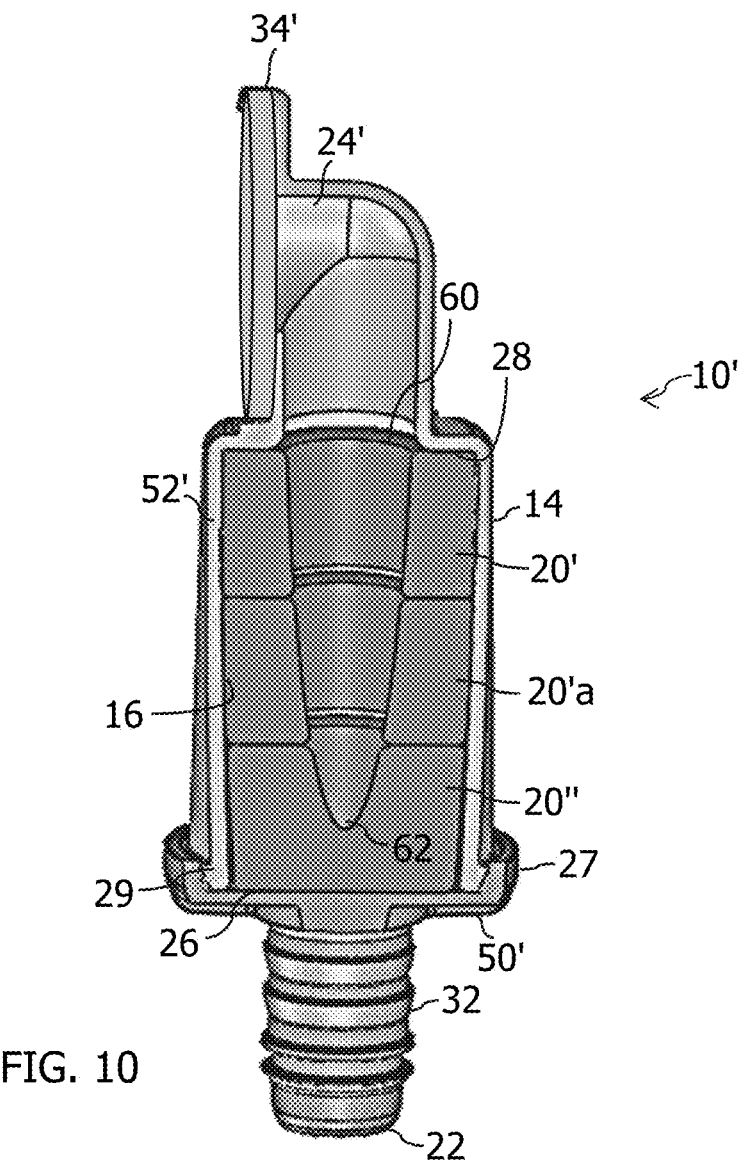
FIG. 10 is a longitudinal, cross-sectional view of an embodiment of a sound attenuation unit that has a plurality of porous sound attenuating members stacked therein.

Alternately or in addition to a bore hole through the porous sound attenuating member, one of the major surfaces of a sound attenuating member may include a depression therein, preferably the major surface facing upstream. For example, the porous sound attenuating member 20" of FIG. 3E includes a depression 56. The depression 56 may be cone-shaped as best seen in FIG. 10. In another embodiment, the depression 56 may be funnel-shaped or any other shape suitable for attenuating the turbulent noise within the system.

Now referring to FIGS. 4-9, other embodiments of sound attenuating units 100 (FIG. 4), 100' (FIG. 6) and alternate components thereof are illustrated. Beginning with FIG. 4 and the longitudinal cross-section thereof in FIG. 7, a noise attenuation unit 100 connectable to become part of a fluid flow path is shown as including a housing 114 defining an internal cavity 116 and having a first port 122 and a second port 124 each connectable to a fluid flow path (not shown) and in fluid communication with one another through the internal cavity 116. Seated within the internal cavity 116 is a noise attenuating member 120, which is seated within the pathway of the fluid communication between the first port 122 and the second port 124. The noise attenuating member 120 allows fluid to flow therethrough from the first port to the second port or vice versa and attenuates sound.

The noise attenuation member 120 may be shaped and made of the materials discussed above with respect to FIGS. 2-3E.

The housing 114 as shown in FIG. 4 may be a multiple piece housing with a plurality of pieces connected together with a fluid-tight seal. The multiple pieces may include a first housing portion 150 that includes the first port 122 and a second housing portion 152 that includes the second port 124. In FIG. 4, the first housing portion 150 is generally cap-shaped and closes the generally cup- or bowl-shaped second housing portion 152 with a fluid-tight seal. While no sealing member is shown seated between the first housing portion 150 and the second housing portion 152, one may be included as described above. The exterior surfaces of the first and second ports 122, 124 both include fitting features 132, 134 for connecting the noise attenuating unit 100 into a fluid flow path. For example, in one embodiment both fitting features 132, 134 are insertable into a hose or conduit and the fitting features provide a secure fluid-tight connection thereto.

As shown in FIG. 4, one or more of the first port 122 and the second port 124 include an elbow. Here, the first port 122 on the cap-shaped first housing portion 150 includes the elbow 160. This first housing portion 150 is positionable for attachment to the second housing 150 portion with the elbow 160 oriented at any angle in a 360 degree radius relative to the second port 124. As shown in FIG. 4, the first port 122 is oriented 180 degrees, and opens in a direction opposite, from the second port 124. In FIG. 5A, the first port 122 is oriented at 90 degrees relative to the second port 124. In FIG. 5B, the first port 122 is oriented at about 60 degrees relative to the second port 124. These embodiments are merely examples of possible orientations for the first port 122 relative to the second port 124, which include myriad possibilities in the 360 degrees about which the first housing portion 150 may be rotated and then fixed to the second housing portion 152.

Figure 9:
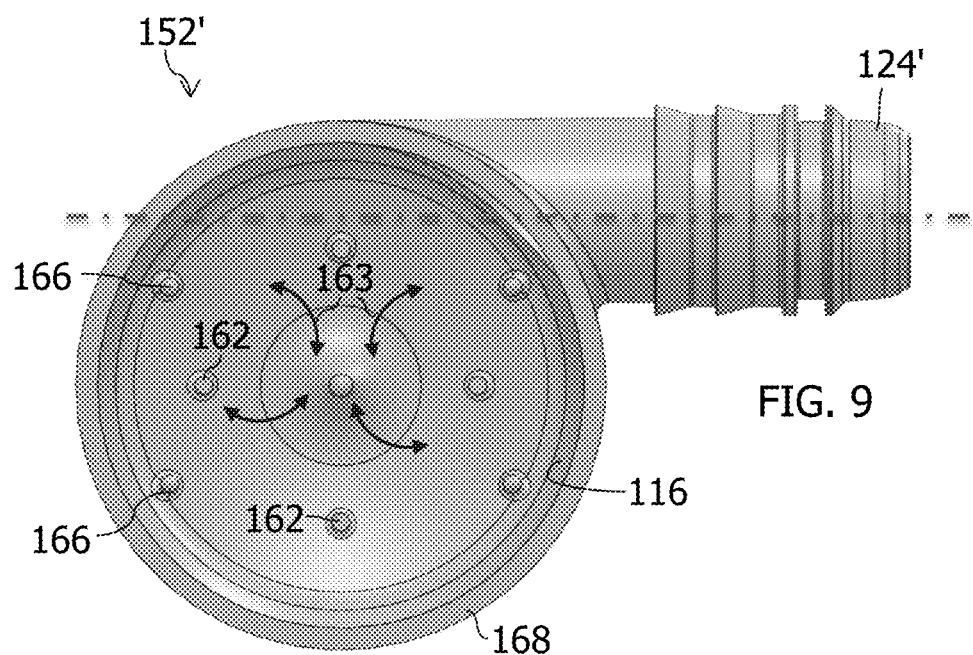
FIG. 9 is a top plan view of an alternate bottom portion of the sound attenuation unit of FIG. 4 without the sound attenuating member seated therein.

As shown in FIG. 4, the first port 122, which includes the elbow 160, enters the internal cavity 116 from the top (or may enter from the bottom) of the housing 114 and the second port 124 enters from a side of the housing 114. As shown in FIG. 6, the sound attenuating unit 100' includes an alternate first housing portion 150' that has a straight first port 122' extending therefrom. The straight first port 122' enters the internal cavity 116 from the top (or may enter from the bottom) of the housing 114' and the second port 124 enters from a side of the housing 114'. As shown in FIG. 9, a second housing portion 152' having a second port 124' entering from the side may have the second port 124' offset from the center of the second housing portion 152'. In FIG. 9, because the second housing portion 152' defining the internal cavity 116 is generally circular from a top plan view, the second port 124' is aligned with a chord of this generally circular shape. The position of the second port 124' in FIG. 9 may in some systems provide improved noise attenuation and/or reduce the amount of pressure drop experienced as fluid flows through the sound attenuating unit.

Figure 7:
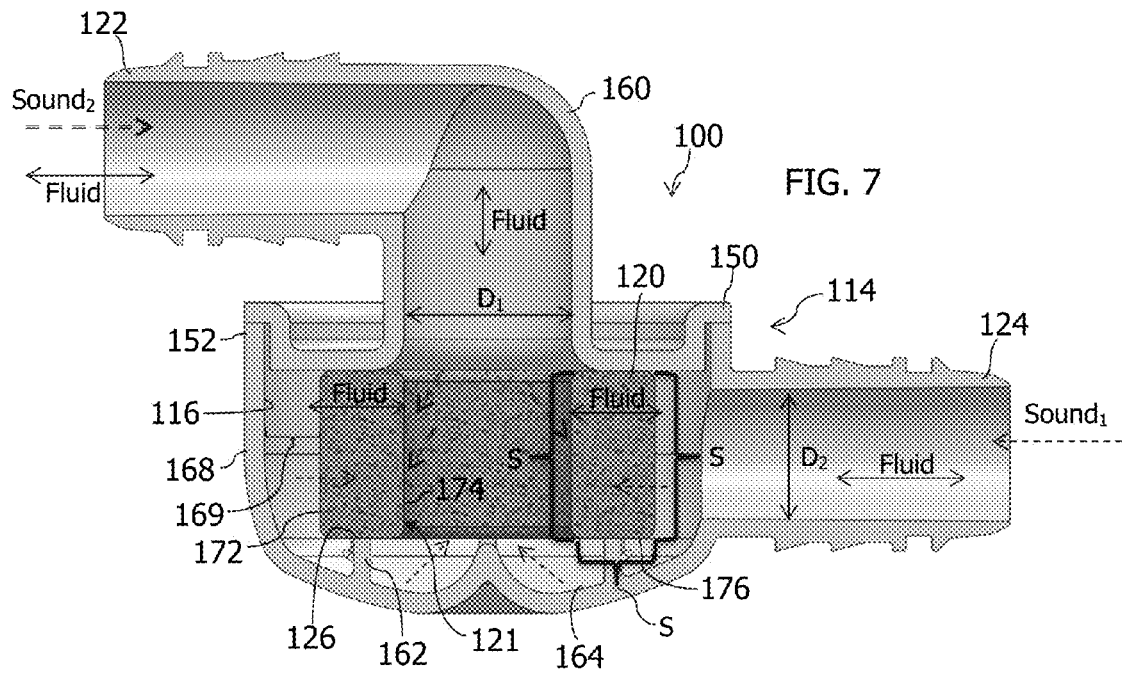
FIG. 7 is a longitudinal, cross-sectional view of the sound attenuation unit of FIG. 4.
Figure 8:
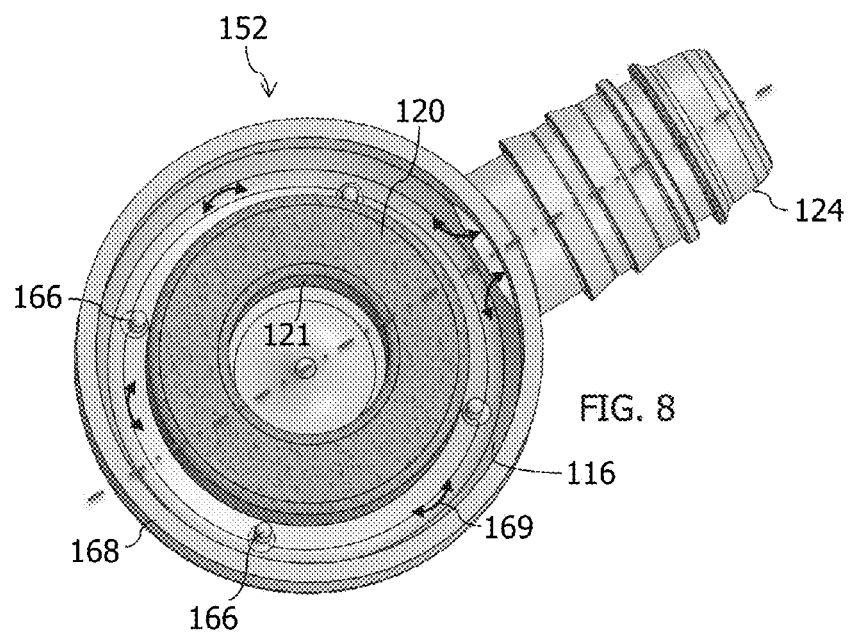
FIG. 8 is a top plan view into the bottom portion of the sound attenuation unit of FIG. 4 with the sound attenuating member seated therein.

Now referring to FIGS. 7-9, the internal cavity 116, which is primarily defined by the second housing portion 152, 152', includes a plurality of support members 162 (FIGS. 7 and 9) extending from the interior bottom 164 thereof upward into the internal cavity 116, 116' to collectively define a first seat 126 upon which the noise attenuating member 120 is seated. The plurality of support members 162 are spaced apart from one another to define a plurality of pathways 163 (FIG. 9) for fluid flow underneath the noise attenuating member 120, i.e., between the noise attenuating member 120 and the interior bottom 164 of the second housing portion 152, 152'.

The internal cavity 116, 116' also includes a plurality of positioning members 166 (FIGS. 8 and 9). Each of the plurality of positioning members 166 are longer than each of the plurality of support members 162 and are spaced apart from one another about the sound attenuating member 120 in positions juxtaposed thereto to hold the sound attenuating member 120 in place at a distance spaced apart from the interior wall(s) 168 of the second housing portion 150, 152'. Accordingly, a fluid flow passage 169 is defined between the noise attenuating member 120 and the interior wall(s) 168 providing fluid communication between the first port 122 and the second port 124 through this secondary fluid flow path around one or more outer sides of the noise attenuating member. The fluid flow passage 169 is in fluid communication with the plurality of pathways 163 underneath the noise attenuating member 120. The plurality of positioning members 166 are typically positioned at positions that are not within the flow path leading to and from the second port 124 to avoid inducing any additional turbulence in the fluid flow.

As can be seen in FIGS. 7-9, the interior bottom 164 of the second housing portion 152, 152' may be contoured to enhance the fluid flow through the sound attenuation unit 100, 100' and to reduce a pressure drop as well. In the illustrated embodiments, the interior bottom 164 beneath the noise attenuating member 120 is generally shaped as the interior of one-half of a horn torus when viewed as a transverse cross-section, which is generally centered under a sound attenuating member 120 that includes one bore 121 therethrough. In embodiments where the sound attenuating member does not include a bore or has a plurality of bores, such as shown in FIGS. 3B and 3C, other contours for the interior bottom 164 of the second housing portion 152, 152' will be more beneficial as can be appreciated by one of skill in the art to enhance fluid flow and reduce the pressure drop.

In each of the embodiments disclosed herein, the fluid flow may be in through the first port and out through the second port or the opposite thereof. With reference to FIG. 7, this concept is shown by the arrows labeled as "Fluid." When the first port 122 is the inlet fluid, the sound is typically entering the sound attenuating unit 100 from the second port 124, which is designated as "$Sound_1$." Conversely, when the second port 124 is the inlet for the fluid, the sound typically enters from the first port 122, which is designated as "$Sound_2$." In the sound attenuating unit 100 of FIG. 7, the inclusion of the plurality of support members 162 to define the plurality of pathways 163 and the dimensions of the sound attenuating unit 120 to define the fluid flow passage 169 provides the advantage of increased surface area contact of the sound with the sound attenuating member 120. In FIG. 7, the surface area S is labeled. Here, the sound can contact the outer surface 172, the inner surface 174 and the bottom surface 176 of the sound attenuating member 120. In comparison, the sound in the embodiment of FIG. 2 has less surface area S to contact when using an equivalently sized sound attenuating member, which includes the inner surface and possibly a portion of the upper surface and/or lower surface. To provide the same amount of surface area in the embodiment of FIG. 2, the overall dimensions of the sound attenuating unit 10 would be required to be larger. Thus, one advantage of the embodiments of FIGS. 4-9 is an overall smaller package, which may be easier to fit within a fluid flow path in an engine.

Another difference in the embodiments of FIG. 2 and FIG. 7 is that the passage straight through the sound attenuating unit 10 of FIG. 2 provides a minimal pressure drop in the fluid flow as it passes therethrough, whereas the fluid flow through the sound attenuating unit 100 of FIG. 7 experiences a pressure drop. Depending on the use of the particular sound attenuation unit, either may be desirable. However, as shown in FIG. 7, features such as the contour of the interior bottom 164 underneath the sound attenuating member 120, increased dimensions for the bore 121 through the sound attenuating member 120, a larger inner dimension for the first port 122 or the second port 124 relative to the other (such as $D_1$ compared to $D_2$), the presence of the fluid flow passage 169, or any combination thereof may be introduced to reduce or minimize the pressure drop as fluid flows through the sound attenuating unit 100.

Turning now to FIG. 10, another embodiment for a noise attenuation unit 10' is illustrated that has many similar features to those of FIGS. 1 and 2. As such, like reference numbers are repeated in FIG. 10. The noise attenuation unit 10' includes a housing 14 defining an internal cavity 16 enclosing a plurality of noise attenuating members 20', 20'a, and 20". The noise attenuating members 20', 20'a, and 20" typically fit securely within the internal cavity in a stacked relationship relative to one another such that the plurality are sandwiched between a first seat 26 and a second seat 28 defined by the housing 14. Collectively as shown in FIG. 10, the plurality of sound attenuating members 20', 20'a, and 20" are stacked such that the combination of bores and depression(s) therein form a generally cone- or funnel-shaped bore that may pass completely therethrough or at least partially therethrough. To collectively form such a shape, the uppermost sound attenuating member 20' (uppermost is relative to the orientation of the illustration on the page) has a funnel-shaped bore that is generally larger than the funnel-shaped bore of the middle sound attenuating member 20'a and the lowermost sound attenuating member 20" has a cone- or funnel-shaped bore or depression that is dimensionally smaller than the bore of the middle sound attenuating member 20'a. Each of the plurality of sound attenuating members 20', 20'a, and 20" are dimensioned such that, when stacked, there is a smooth gradual taper from the wide end 60 of the overall bore or depression to the narrower end 62.

The housing defines a first port 22 in fluid communication with the internal cavity 16 and a second port 24 in fluid communication with the internal cavity 16. The exterior surfaces of the housing 14 that define the first and second ports 22, 24 both include fitting features 32, 34 for connecting the noise attenuating unit 10 into a fluid flow path of the engine. For example, in one embodiment both fitting features 32, 34 are insertable into a hose or conduit and the fitting features provide a secure fluid-tight connection thereto.

The housing 14, as shown in FIG. 10, may be a multiple piece housing with a plurality of pieces connected together with a fluid-tight seal. The multiple pieces may include a first housing portion 50' that includes the first port 22 and a female end 27 and a second housing portion 52' that includes the second port 24' and a male end 29. The male end 29 is received in the female end 27 to provide a fluid-tight seal between the portions 50, 52.

In FIG. 10, the noise attenuating members 20', 20'a, and 20" are dimensioned for a tight fit within the housing and thereby the fluid flow through the internal cavity 16 is only available through the sound attenuating members and any bores that may be included therein.

In the embodiment of FIG. 10, the first port 22 and the second port 24' are positioned opposite one another to define a generally linear flow path through the noise attenuation unit 10, but are not limited to this configuration. The sound attenuating members 20' 20'a, and 20" are typically made of a porous material as described above.

Having described the invention in detail and by reference to specific embodiments thereof, it will be apparent that numerous modifications and variations are possible without departing from the spirit of the invention as defined by the following claims.

What is claimed is:

1. A noise attenuation unit connectable to a fluid flow path of an engine comprising:
   a housing consisting essentially of a first housing portion defining a first port and a second housing portion defining a second port, the first housing portion and the second housing portion are mated together with a fluid-tight seal to define an internal cavity in fluid communication with the first port and the second port; and
   a porous noise attenuating material dimensioned for a tight fit within the internal cavity and seated therein, the porous noise attenuating material comprising a plurality of stacked plugs of porous material, wherein one of the plurality of stacked plugs has a bore therethrough and one has a bore partially therein that is larger than pores of the porous material, and the combination thereof is stacked to form a hollow portion in general alignment with the first port and the second port;
   wherein fluid flow from the first port to the second port through the internal cavity is only through the porous noise attenuating material
   wherein the bore therethrough or the bore partially therein are each larger than pores of the porous material.

2. The noise attenuation unit of claim 1, wherein the first port and the second port are aligned opposite one another and the porous noise attenuating material is sandwiched between a first seat of the first housing portion and a second seat of the second housing portion.

3. The noise attenuation unit of claim 2, wherein one or more of the first port and the second port include an elbow.

4. The noise attenuation unit of claim 1, wherein one of the first housing portion and the second housing portion defines a container for the noise attenuating member and the other thereof defines a cap for the container.

5. The noise attenuation unit of claim 1, further comprising a sealing member seated between the first housing portion and the second housing portion to provide the fluid-tight seal therebetween.

6. The noise attenuation unit of claim 1, wherein the bore has a diameter of about 3 mm to about 5 mm.

7. The noise attenuation unit of claim 1, wherein the bore partially therein defines a hollow portion that is generally cone-shaped.

8. The noise attenuation unit of claim 1, wherein the bore has a diameter of about 3 mm to about 5 mm.

9. The noise attenuation unit of claim 1, wherein the hollow portion is generally cone- or funnel-shaped.

10. The noise attenuation unit of claim 1, wherein the porous noise attenuating material is made from woven wire, matted wire, sintered particles, woven fibers, or matted fibers of metal, plastic, ceramic, or glass.

11. The noise attenuation unit of claim 10, wherein the porous noise attenuating material is in the shape of a plug.

12. A fluid flow system of an internal combustion engine comprising:
    a device for generating vacuum comprising a Venturi portion and/or a check valve; and
    a noise attenuation unit of claim 1 positioned downstream of the Venturi device and/or the check valve.

13. The fluid flow system of claim 12, wherein the porous noise attenuating material is made from woven wire, matted wire, sintered particles, woven fibers, or matted fibers of metal, plastic, ceramic, or glass.

* * * * *